(12) United States Patent
Wideman (10) Patent No.: US 10,496,523 B2
(45) Date of Patent: *Dec. 3, 2019

(54) SEQUENTIAL ACCESS STORAGE AND DATA DE-DUPLICATION

(71) Applicant: Quantum Corporation, San Jose, CA (US)

(72) Inventor: Roderick B. Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,023

(22) Filed: Dec. 20, 2016

(65) Prior Publication Data

US 2017/0102897 A1 Apr. 13, 2017

Related U.S. Application Data

(63) Continuation of application No. 12/861,231, filed on Aug. 23, 2010, now Pat. No. 9,569,134.

(51) Int. Cl.
*G06F 12/02* (2006.01)
*G06F 11/36* (2006.01)
(Continued)

(52) U.S. Cl.
CPC ........ *G06F 11/3664* (2013.01); *G06F 3/0608* (2013.01); *G06F 3/0611* (2013.01);
(Continued)

(58) Field of Classification Search
None
See application file for complete search history.

(56) References Cited

U.S. PATENT DOCUMENTS 7,161,506 B2   1/2007   Fallon
7,378,992 B2   5/2008   Fallon
(Continued)

OTHER PUBLICATIONS

Patent Cooperation Treaty (PCT), International Search Report and Written Opinion from copending PCT International Patent Application No. PCT/US2011/48041 (International Filing Date Aug. 17, 2011) dated Jan. 5, 2012, 8 pages.

(Continued)

*Primary Examiner* — Charles Rones
*Assistant Examiner* — Ryan Dare
(74) *Attorney, Agent, or Firm* — Eschweiler & Potashnik, LLC (57) ABSTRACT

An example method includes determining a configuration of two or more partitions for a sequential access medium. At least one partition stores data de-duplication data structures while at least one other partition stores a repository of unique data blocks associated with the data structures. The method also includes controlling a data de-duplication computer to configure the sequential access medium according to the configuration. The method includes producing an output sequence for writing the data structures and a set of unique data blocks associated with the set of data structures to the sequential access medium as configured with the two or more partitions. One embodiment includes controlling a data de-duplication computer to write the data de-duplication data structures and the set of unique data blocks to the sequential access medium according to the output sequence.

14 Claims, 7 Drawing Sheets

(51) Int. Cl.
*G06F 3/06* (2006.01)
*G06F 9/455* (2018.01)
*G06F 9/50* (2006.01)

(52) U.S. Cl.
CPC .......... *G06F 3/0641* (2013.01); *G06F 3/0644* (2013.01); *G06F 3/0686* (2013.01); *G06F 9/45558* (2013.01); *G06F 9/5077* (2013.01); *G06F 2009/45562* (2013.01); *G06F 2009/45591* (2013.01)

(56) References Cited

U.S. PATENT DOCUMENTS

| | | | |
|---|---|---|---|
| 7,415,530 | B2 | 8/2008 | Fallon |
| 8,643,513 | B2 | 2/2014 | Fallon |
| 9,054,728 | B2 | 6/2015 | Fallon |
| 9,116,908 | B2 | 8/2015 | Fallon |
| 2009/0013129 | A1 | 1/2009 | Bondurant |
| 2009/0013140 | A1* | 1/2009 | Bondurant ............ G06F 3/0608 711/162 |
| 2009/0193223 | A1 | 7/2009 | Saliba et al. |
| 2009/0313248 | A1 | 12/2009 | Balachandran et al. |
| 2010/0042790 | A1 | 2/2010 | Mondal et al. |
| 2010/0094817 | A1 | 4/2010 | Ben-Shaul et al. |

OTHER PUBLICATIONS

Non-Final Office Action dated Jun. 18, 2015 for U.S. Appl. No. 12/861,231.
Final Office Action dated Dec. 1, 2015 for U.S. Appl. No. 12/861,231.
Non-Final Office Action dated Jul. 15, 2016 for U.S. Appl. No. 12/861,231.
Notice of Allowance dated Oct. 7, 2016 for U.S. Appl. No. 12/861,231.

* cited by examiner

SEQUENTIAL ACCESS STORAGE AND DATA DE-DUPLICATION

REFERENCE TO RELATED APPLICATION

This Application is a Continuation of U.S. application Ser. No. 12/861,231 filed on Aug. 23, 2010, the contents of which is hereby incorporated by reference in its entirety.

BACKGROUND

Conventionally, linear tape (e.g., LTO-4) has been organized as a single volume that is accessed from the beginning of the medium to the end of the medium. From the user conceptual perspective, a single volume linear tape is addressed and accessed via sequential logical blocks. A physical correlation between a logical block and a physical block(s) is provided by a device (e.g., tape drive) that provides access to the medium. While linear tape has provided advantages in many applications, it has typically not been employed with data de-duplication applications.

One skilled in the art knows that data de-duplication applications may produce fragmented data representations. Reconstituting an original data item (e.g., a file) from the fragmented data representation may involve random input/output (i/o) patterns that are unsuited to sequentially accessing linear tape. More generally, the random i/o patterns associated with data de-duplication have been problematic for sequential access storage devices.

Data de-duplication applications may also use multiple data structures (e.g., index, reconstitution recipes, catalogs) that grow at different rates and a repository of unique data blocks that may grow. The data structures store information related to the unique data blocks and to combinations of unique data blocks. These data structures and the repository may be continually growing and contracting in ways that produce random inputs and outputs to the media on which the structures are stored. Conventionally, sequential access storage media have had a single partition that made it difficult, if even possible at all, to accommodate these growing and changing data structures and their associated repository of unique data blocks. Thus, data de-duplication has typically not been supported with sequential access devices because it was difficult, if even possible at all, to arrange data structures and the underlying unique data blocks in an organization that provided practical utility for data de-duplication.

The foregoing statements are not intended to constitute an admission that any patent, publication or other information referred to herein is prior art with respect to this disclosure. Rather, these statements serve to present a general discussion of technology and associated issues in the technology.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or multiple elements can be designed as one element. In some examples, an element shown as an internal component of another element can be implemented as an external component and vice versa. Furthermore, elements may not be drawn to scale.

DETAILED DESCRIPTION

Example methods and apparatuses concern using sequential access storage with data de-duplication applications. Some sequential access storage media (e.g., linear tape) can be physically partitioned. A partitioned medium may support multiple logical volumes as opposed to a single physical volume. Having multiple logical volumes available on a sequential access storage medium facilitates supporting data de-duplication using the sequential access storage medium.

In one example, dividing a sequential access storage medium into multiple partitions facilitates arranging different data de-duplication data structures in different partitions, which in turn enhances practical utility for data de-duplication. In one example, a sequential access storage medium may be divided into two partitions. One partition stores data blocks in the unique data repository while the other partition stores the data de-duplication data structures (e.g., index, recipes). The two partitions have their own sets of logical blocks and can be read and/or written separately.

By way of illustration, with two partitions available, the data structures may be in a first partition and the unique data blocks may be in a second partition. A change to an entity in one partition on the medium may not cause or require a change to an entity in another partition on the medium. For example, removing a recipe for a file that has been deleted may have no effect on the data repository. If both partitions have space available, adding a block to the data repository may cause a write in the first partition (e.g., writing the block) on the medium and may also cause a write in the second partition (e.g., adding a hash to the index, updating a recipe) on the medium. However, performing the write in one partition does not require destroying (e.g., over writing) data in the other partition because both partitions had room available and could be read/written independently. Conventionally, if only a single partition was available, it may have been difficult, if even possible at all, to accommodate both writes without requiring rewriting the entire single partition.

In one example two partition configuration, the data structure partition is organized with the data recipes following the index, while in another example the index follows the data recipes. The index may include, for example, identifiers (e.g., hashes) for unique data blocks, reference counts for unique data blocks, logical block addresses and lengths for unique data, a catalog (e.g., namespace representation) of recipes in the partition, and/or other items. In one example, a data recipe includes identifiers of the set of unique data blocks that would be used to reconstitute a data item (e.g., file) in its original form. The identifiers may be organized, for example, as a list, a linked list, and in other forms. In different examples, the identifiers may store logical block addresses and lengths, may indirectly refer to blocks through the index, or may store other information. In different examples, the unique data repository may be one set of blocks or may use file markers to delineate groupings of unique data.

In one example, a process for reading a de-duplicated data item from a sequential access medium can include first accessing and analyzing identifiers in one or more data recipes. Analyzing the identifiers may provide information upon which a suitable i/o strategy can be planned. For example, the i/o strategy may involve sorting the identifiers so that data blocks can be read from the data repository in sequential order. This mitigates issues associated with conventional random i/o. The suitability of the i/o strategy may be determined by factors including, but not limited to, the medium, the device, the arrangement of data blocks in the unique data repository, the number of partitions, and the arrangement of data structures in a partition. Reading the de-duplicated data item may then involve executing the i/o strategy and assembling the data item according to the recipe. One skilled in the art will appreciate that in some instances data blocks may need to be buffered (e.g., on disk) while assembling the data item.

In one example, the index would be read from the sequential access medium and stored in memory, on disk, on a combination of memory and disk, or otherwise. When the index includes a catalog, the catalog may also be read from the sequential access medium and stored in memory, on disk, on a combination of memory and disk, or otherwise. Some or all of the data recipes may also be read from the sequential access medium and stored in memory, on disk, on a combination of memory and disk, or otherwise.

In one example, the index and data recipes may be located in the same partition. In another example, the index and recipes may be located in separate partitions. When the index is updated, the newly updated index may be written to the sequential access medium. If a new unique block is encountered, then some recipe may need to be created or updated and the index may also need to be updated. In one example, the new or updated recipe may be written at the end of existing recipes on the sequential access medium, which may overwrite part of the index, in which case the index may need to be rewritten. In another example, the index may first be rewritten, which may overwrite part of the recipes, in which case the recipes may then need to be rewritten.

A sequential access medium may have a finite size. Different de-duplicated data sets may yield different combinations of indexes, recipes, and unique data blocks. For example, one de-duplicated data set may yield a large number of recipes and a large index associated with a large number of small unique blocks. In this example, the ratio of space consumed by recipes and index as compared to space consumed by unique data may differ dramatically from another de-duplicated data set that has a small number of recipes and a small index associated with a small number of large unique blocks. Therefore, in one example, before transferring an index, recipes, and unique data to the sequential access medium, suitable partition sizes and/or block sizes may be determined for the medium. Also, before starting a transfer, a determination may be made concerning whether the medium has adequate capacity for the combination of index, recipes, and unique data blocks. However, complete and/or adequate information concerning data set sizes, data structure sizes, data block sizes, and so on, may not be available and thus default sizes, partitions, and configurations may be employed.

One process for writing an index, recipes, and de-duplicated data blocks to a sequential access medium (e.g., tape) may include accessing de-duplicated data including its index, recipes, and unique blocks. The process may include determining the number of partitions available on a target sequential access medium, determining the size of partitions to be created, determining the order of partitions to be created, and determining the arrangement of items in a partition(s). The process may also include determining whether the target sequential access medium has sufficient capacity for the intended output. Once the determinations are made, then an i/o strategy can be devised. The i/o strategy can control how items are written to the sequential access medium. However, complete and/or adequate information concerning data set sizes, data structure sizes, data block sizes and so on, may not be available and thus default sizes, partitions, and configurations may be employed.

In one example, items may be written out continuously and sequentially as a large object while in another example file marks may be used to delineate objects. One skilled in the art will appreciate that writing a new data set to a previously unwritten tape may be performed differently than updating a data set on a previously written tape.

Figure 1:
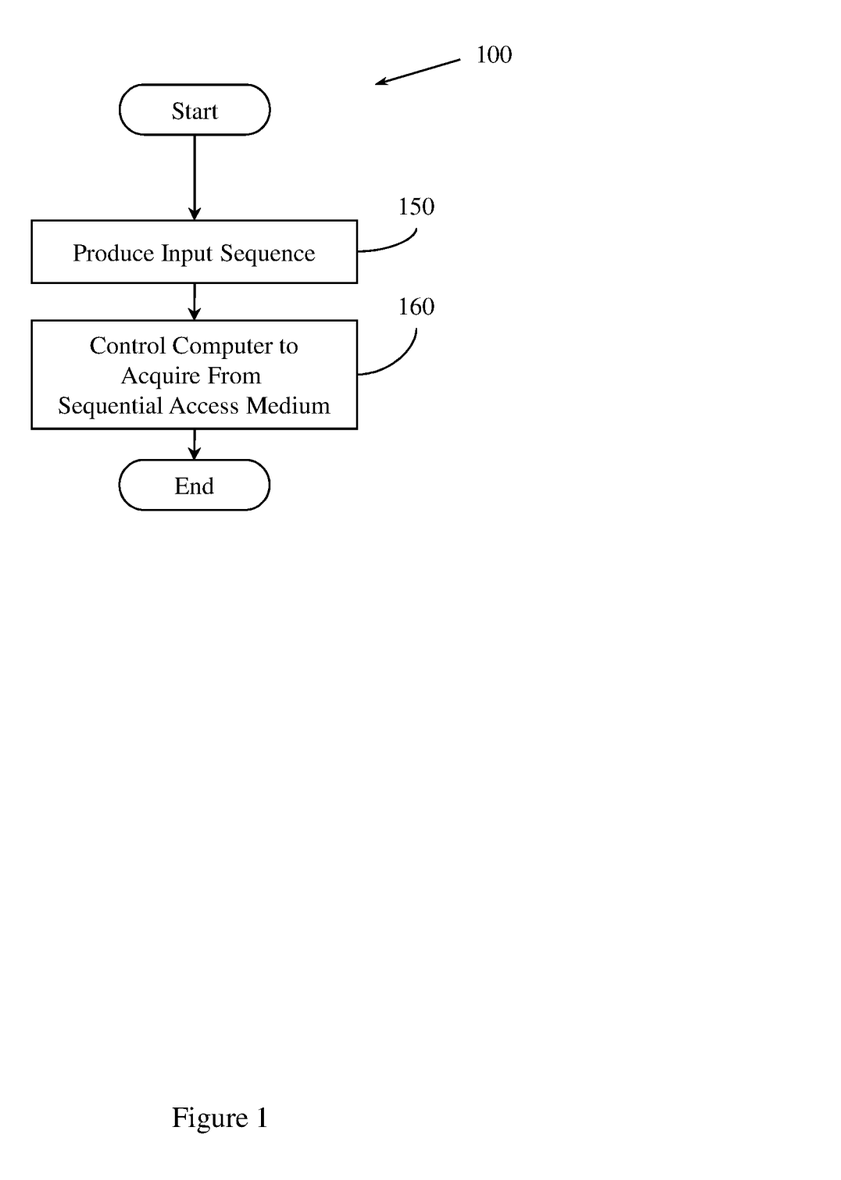
FIG. 1 illustrates a flow chart that describes a method associated with sequential access storage and data de-duplication.

FIG. 1 illustrates a method 100 associated with sequential access storage and data de-duplication. Method 100 includes, at 150, producing an input sequence. The input sequence will be used to control acquiring a set of unique data blocks associated with a data de-duplication application. The set of unique data blocks will be acquired from a sequential access medium (e.g., LTO tape) associated with a sequential access device (e.g., tape drive). The sequential access medium is partitioned and stores data de-duplication data structures in one or more first partitions and stores a repository of one or more unique data blocks associated with the data de-duplication data structures in one or more second partitions. The first partition(s) are different than the second partition(s).

Method 100 also includes, at 160, controlling a data de-duplication computer to acquire the set of unique data blocks from the sequential access medium according to the input sequence. In one example, the set of unique data blocks to be acquired are identified in one or more data reconstitution recipes. The recipes may describe, for example, files that have been chunked and hashed by a data de-duplication application. While a file is described, one skilled in the art will appreciate that other data items (e.g., emails, videos, objects, binary large objects (BLOBs)) can be processed by a data de-duplication application. Since method 100 will be accessing a sequential access medium associated with a sequential access device, in one example, the input sequence will be designed based on the order in which the set of unique data blocks appear on the sequential access medium. For example, the input sequence may be a sorted list of unique data blocks. The list may be sorted in order from a unique data block that will be encountered first during a sequential read from the sequential access medium to the unique data block that will be encountered last during the sequential read from the sequential access medium. While a sorted list is described, one skilled in the art will appreciate that other data structures (e.g., linked list, table, tree) can be used to store the input sequence.

The data de-duplication structures can include an index, a catalog, a set of recipes, and other items. When the sequential access medium is configured with two partitions the data de-duplication data structures are stored on a first of the two partitions, and the repository is stored on a second of the two partitions. Since one partition may store more than one data structure, in different examples the order of the data structures in the partition can vary. For example, the order of data structures in the partition storing the data de-duplication data structures can have the index first and the recipes second, or vice versa. Thus, producing the input sequence at 150 may include considering the order of partitions and the order of things in a partition.

The sequential access medium may be configured with more than two partitions. When the sequential access medium is configured with more than two partitions, a first of the more than two partitions may store the index, a second of the more than two partitions may store other data structures (e.g., catalog, recipes), and a third of the more than two partitions stores the repository. Once again, producing the input sequence at 150 may include considering the order of partitions and the order of things in a partition.

Figure 2:
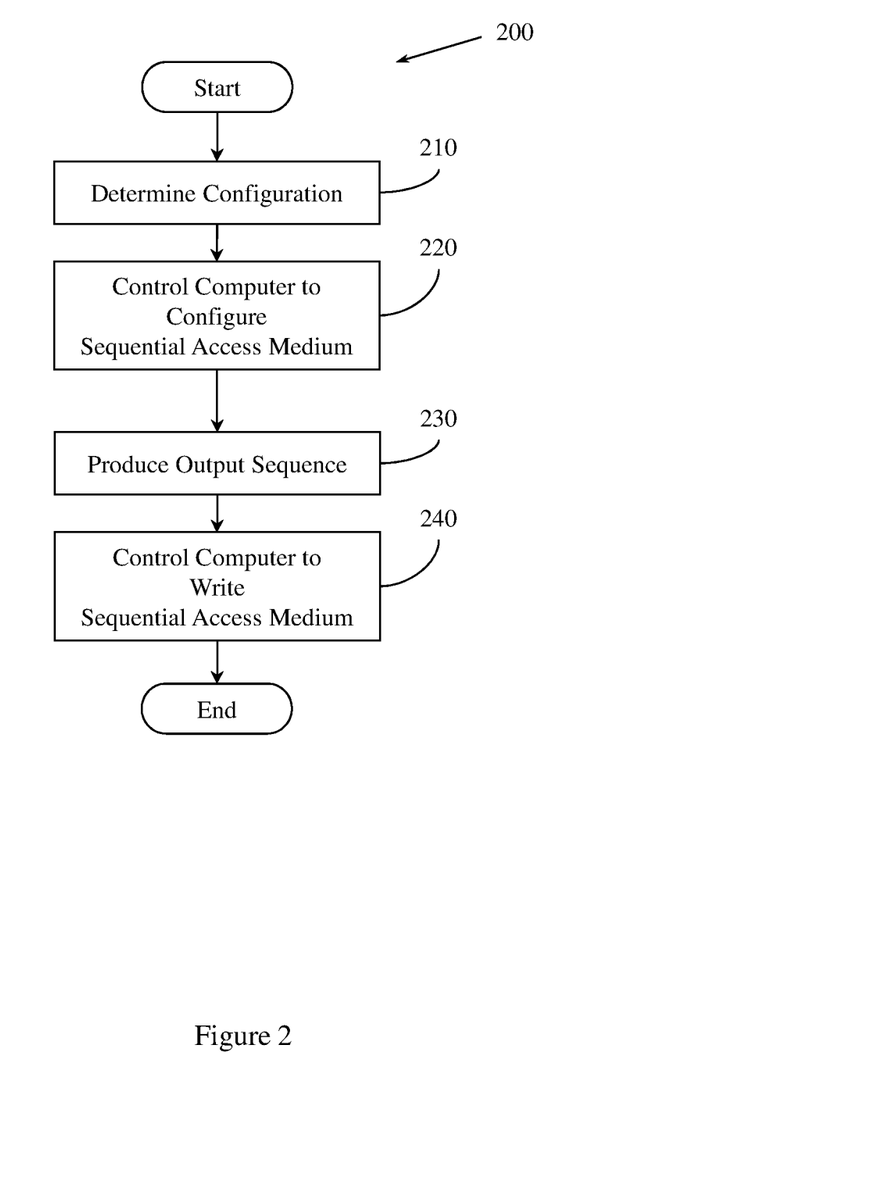
FIG. 2 illustrates a flow chart that describes a method associated with sequential access storage and data de-duplication.

FIG. 2 illustrates a method 200 associated with sequential access storage and data de-duplication. Method 200 includes, at 210, determining a configuration for a sequential access medium. The sequential access medium is being configured to store one or more data de-duplication data structures and a repository of unique data blocks associated with the set of data de-duplication data structures. The data structures and the repository are to be stored in separate partitions. The sequential access medium is configurable with two or more partitions and how the medium will be configured depends, at least in part, on a number of partitions available to create on the sequential access medium. For example, if there are two partitions available, the data structures may go in one partition while the data repository goes in another partition. However, if there are four partitions available, then three different data structures (e.g., index, catalog, recipes) may each get their own partition while the repository gets its own partition. One skilled in the art will appreciate that a greater and/or lesser number of partitions may be employed and that data structures and the repository can be stored in different partitions in different examples.

Method 200 also includes, at 220, controlling a data de-duplication computer to configure the sequential access medium according to the configuration. This may involve programming and/or controlling a tape drive.

Method 200 also includes, at 230, producing an output sequence for writing data de-duplication data structures and a set of unique data blocks associated with the set of data de-duplication data structures to the sequential access medium as it has been configured. Thus, the output sequence may describe how data structures are to be written to one partition(s) while data blocks in the repository are to be written to another partition(s).

Method 200 also includes, at 240, controlling a data de-duplication computer to write the one or more data de-duplication data structures and the set of unique data blocks to the sequential access medium according to the output sequence. Thus, at 240, the data structures and data blocks are actually written to a sequential access medium (e.g., tape) using sequential writes.

The configuration determined at 210 can depend on a number of factors. For example, the configuration can depend on an order for the partitions on the sequential access medium, the contents of a partition on the sequential access medium, and the order of the contents of a partition on the sequential access medium. While these factors are described, one skilled in the art will appreciate that other factors may be considered.

Figure 3:
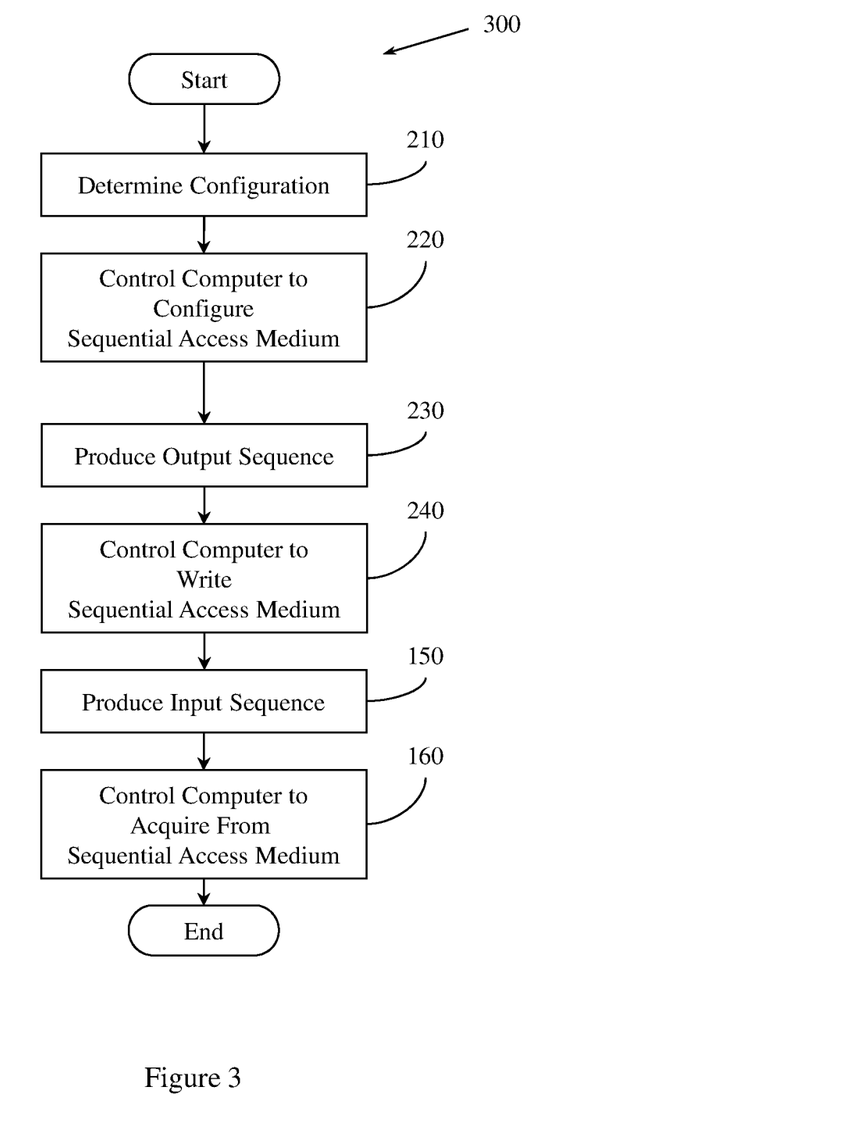
FIG. 3 illustrates a flow chart that describes a method associated with sequential access storage and data de-duplication.

FIG. 3 illustrates a method 300 associated with sequential access storage and data de-duplication. Method 300 includes all the actions of methods 100 and 200 and thus describes both preparing a tape to store data de-duplication data and data structures, writing the data and data structures to the tape, and then subsequently accessing a subset of the data using the data structures to plan sequential reads to make reading the subset of data more efficient than in conventional systems.

Figure 4:
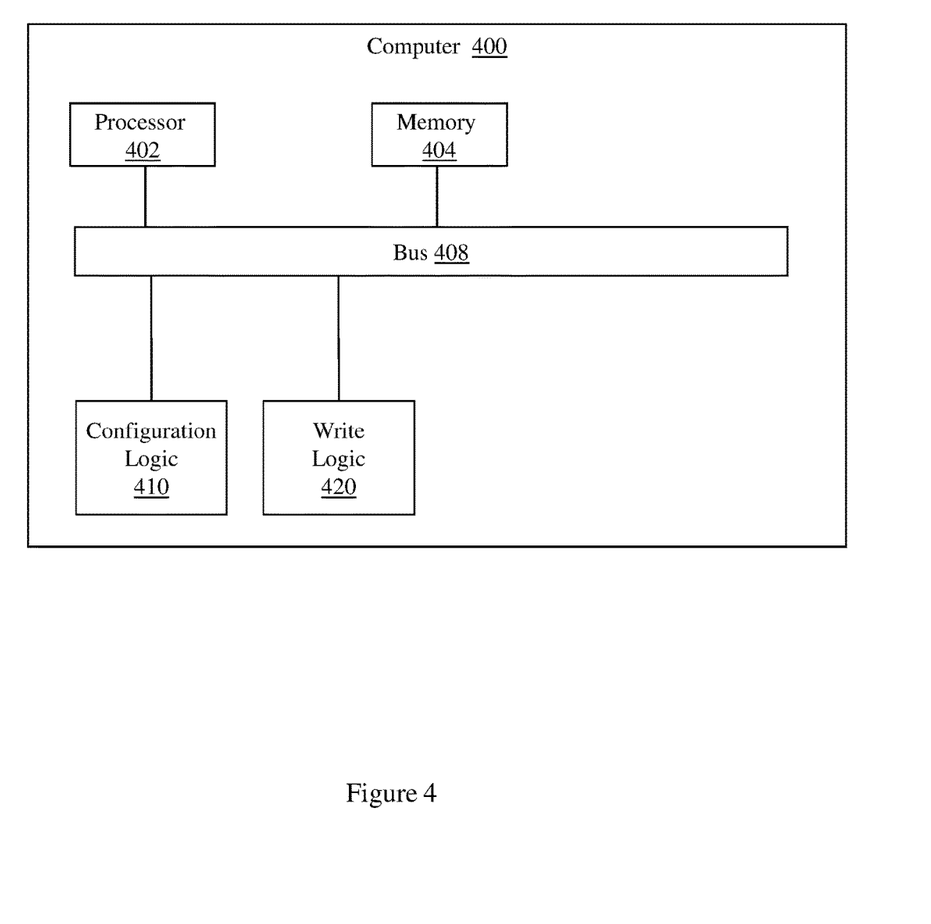
FIG. 4 illustrates an apparatus associated with sequential access storage and data de-duplication.

FIG. 4 illustrates an apparatus 400 associated with sequential access storage and data de-duplication. Apparatus 400 includes a processor 402, a memory 404, and an interface 408 connecting the processor 402, the memory 404, and a set of logics. The interface 408 may be, for example, a bus.

The set of logics may include a configuration logic 410 and a write logic 420. The configuration logic 410 may be configured to prepare a sequential access medium to store a set of data de-duplication data structures. The configuration logic 410 may also be configured to prepare the sequential access medium to store a repository of data blocks associated with the set of data de-duplication data structures. Preparing the sequential access medium may include partitioning the sequential access medium into two or more partitions.

Figure 6:
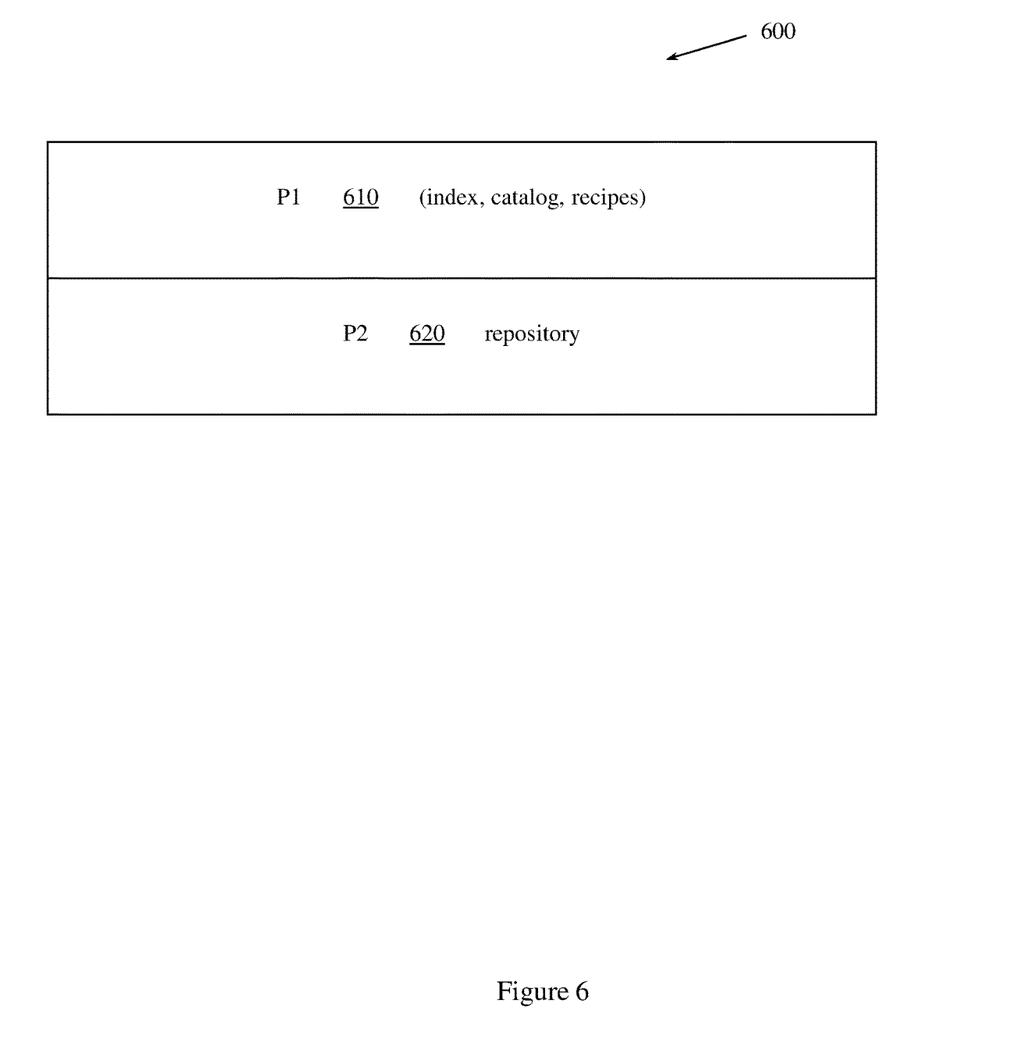
FIG. 6 illustrates a sequential access storage medium partitioned to support data de-duplication.

The write logic 420 is configured to write the set of data de-duplication data structures and the repository of data blocks to the sequential access medium. In one example, the set of data de-duplication data structures is written to one partition and the repository of data blocks is written to a second, different partition. FIG. 6 illustrates one example of this type of configuration, where a first partition P1 610 stores data structures (e.g., index, catalog, recipes) while a second partition P2 620 stores the repository.

The configuration logic 410 can analyze different things to determine how to lay out the sequential access medium. For example, the configuration logic 410 can consider items including, but not limited to, the number of partitions into which the sequential access medium can be partitioned, the number of data structures in the set of data de-duplication data structures, and a desired order of data structures in a partition(s).

Figure 7:
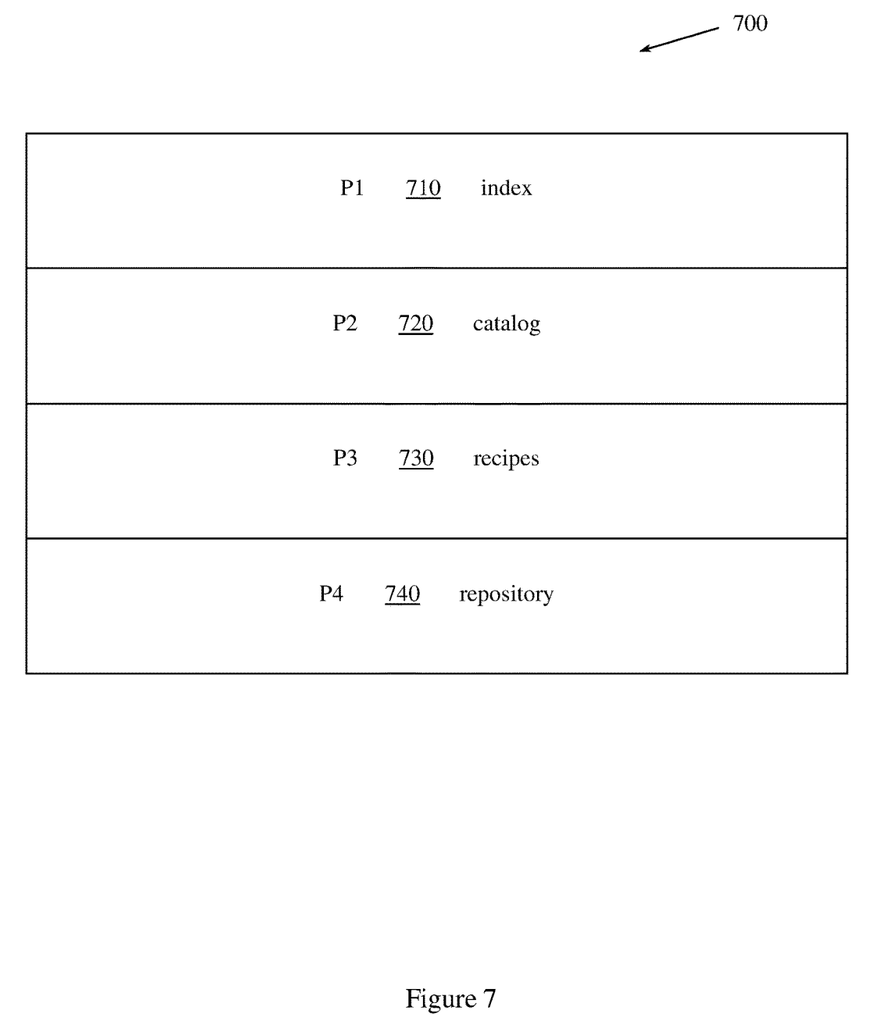
FIG. 7 illustrates a sequential access storage medium partitioned to support data de-duplication.

In one example, the configuration logic 410 may partition the sequential access medium into more than two partitions. In this example, the write logic 420 may write one member of the set of data de-duplication data structures to one partition, may write a second member of the set of data de-duplication data structures to a second partition, and may write the repository of data blocks to a third partition. FIG. 7 illustrates an embodiment with multiple partitions where a first partition P1 710 stores an index, a second partition P2 720 stores a catalog, a third partition P3 730 stores data reconstitution recipes, and a fourth partition P4 740 stores the repository. One skilled in the art will appreciate that other embodiments may have different numbers of partitions and that items can be arranged in different partitions.

Figure 5:
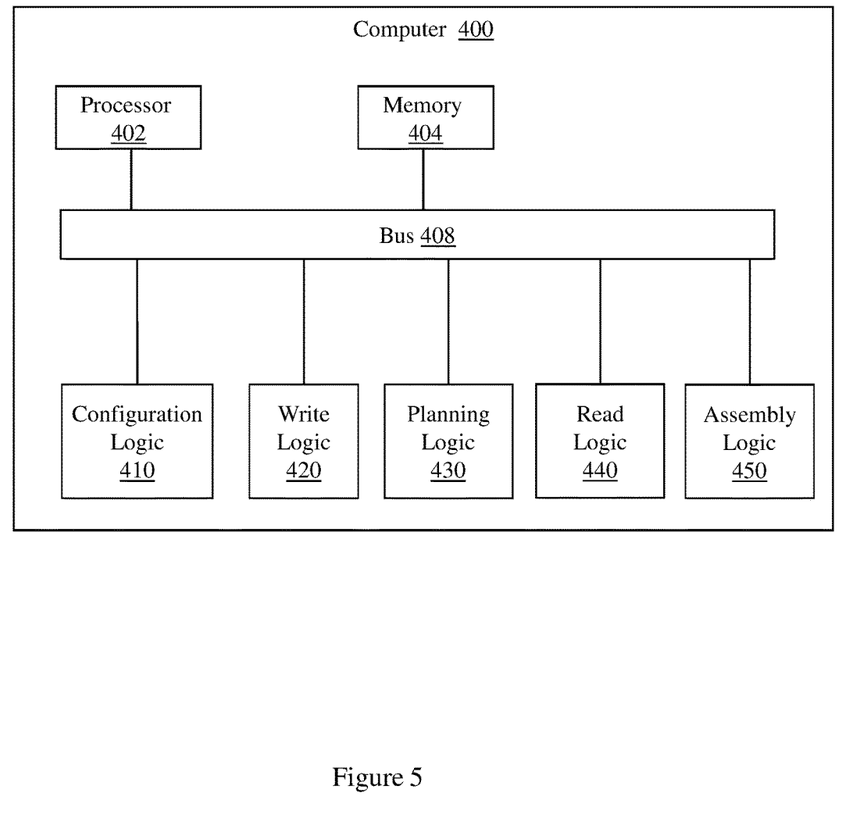
FIG. 5 illustrates an apparatus associated with sequential access storage and data de-duplication.

FIG. 5 illustrates another embodiment of apparatus 400. This embodiment has additional logics including a planning logic 430, a read logic 440, and an assembly logic 450.

The planning logic 430 is configured to determine an input plan for reading a set of data blocks from the sequential access medium. Since the access medium is a sequential access medium, the planning logic 430 will design the input plan to mitigate the effects of random i/o associated with data de-duplication while enhancing the effects of sequential reading available through a sequential access device. In one example, the input plan may be a sorted list of blocks. By way of illustration, a user may want to access two files and some archived emails. The files and archived emails may have been processed by a data de-duplication application and therefore unique blocks of data may be stored in the repository on a tape. Information concerning the unique blocks may be available in the data structures on the tape. The recipes for the files and emails may be accessed, and an input plan for reading the data blocks for the items may be prepared in light of the information stored in the recipes. In one example, blocks for the different items can be read and buffered and then assembled after acquisition.

The read logic 440 will read the set of data blocks according to the input plan and the assembly logic 450 can assemble the data items from the set of data blocks. Thus, rather than input being performed on a file based approach, input may be designed to be performed on a sequence based approach. While the file based approach may produce random i/o unsuitable for sequential access media, the sequence based approach may produce sequential i/o that is suitable for sequential access media.

Apparatus 400 may, therefore, be configured to perform a method that includes partitioning a sequential access medium into two or more partitions, storing data blocks from a data de-duplication application in one of the two or more partitions, and storing data structures associated with the data de-duplication application in a different one of the two or more partitions. Apparatus 400 may also be configured to perform a method that includes planning to read data from the sequential access medium and then reading the data sequentially to mitigate the effects of random i/o.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
  a processor;
  a memory; and
  an interface connecting the processor, the memory, and a set of logics, the set of logics comprising:
    a sequential access logic configured to determine a configuration for a sequential access storage medium to store one or more data de-duplication data structures and a repository of unique data blocks associated with the one or more data de-duplication data structures;
    a storage system configuration logic configured to control a data de-duplication system to configure the sequential access storage medium according to the configuration;
    an input sequence logic configured to produce an input sequence for acquiring, from the sequential access storage medium, a retrieval set of unique data blocks associated with a data de-duplication application, where the input sequence is a sorted list of unique data blocks; and
    an acquisition logic configured to control the data de-duplication system to acquire the retrieval set of unique data blocks from the sequential access storage medium according to the input sequence.

2. The apparatus of claim 1, where the sequential access storage medium is linear tape.

3. The apparatus of claim 2, where the sequential access storage medium is configurable with more than two partitions.

4. The apparatus of claim 3, where the sequential access logic determines the configuration based, at least in part, on a number of partitions available to create on the sequential access storage medium.

5. The apparatus of claim 4, where the configuration further depends on an order for the partitions on the storage medium and one or more of, the contents of a partition on the sequential access storage medium, and the order of the contents of a partition on the sequential access storage medium.

6. The apparatus of claim 1, the set of logics further comprising:
  a write logic that produces an output sequence for writing the one or more data de-duplication data structures and a unique set of data blocks associated with the one or more data de-duplication data structures to the sequential access storage medium as configured, and that controls a data-deduplication system to write the one or more data de-duplication data structures and the set of unique data blocks to the sequential access storage medium.

7. A system for sequential access storage and data-deduplication, the system comprising:
  means for producing an input sequence for acquiring, from a sequential access medium associated with a sequential access device, a set of unique data blocks associated with a data de-duplication application, where the set of unique data blocks are identified in one or more data reconstitution recipes, where the input sequence is a sorted list of unique data blocks, where the input sequence depends, at least in part, on the order in which the set of unique data blocks appear on the sequential access medium;
  means for configuring the sequential access medium with a plurality of partitions, where the sequential access medium stores one or more data de-duplication data structures in a first partition, and stores a repository of one or more unique data blocks associated with the one or more data de-duplication data structures in a second partition, where the order of data structures in the partition storing the data de-duplication data structures is one of, index first and recipes second, and recipes first and index second; and means for controlling a data de-duplication computer to acquire the set of unique data blocks from the sequential access medium according to the input sequence.

8. The system of claim 7, where the sorted list is sorted in order from a unique data block that will be encountered first during a sequential read from the sequential access medium to the unique data block that will be encountered last during the sequential read from the sequential access medium.

9. The system of claim 8, where the sequential access medium is linear tape, and where the sequential access device is a tape drive.

10. The system of claim 9, where the one or more data de-duplication data structures comprises a catalog of recipes.

11. The system of claim 10, where the one or more data de-duplication data structures further comprises a data reconstitution recipe, where a data reconstitution recipe describes which blocks comprise a data item, and the order of blocks in a data item.

12. The system of claim 7, where the plurality of partitions includes at least three partitions, where the first of the plurality of partitions stores the index, where the second of the plurality of partitions stores a recipe, and where a third of the plurality of partitions stores the repository.

13. A non-transitory computer-readable storage medium storing computer-executable instructions that when executed by a computer control the computer to perform a method, the method comprising:

preparing a sequential access medium to store a set of data de-duplication data structures and a repository of data blocks associated with the set of data de-duplication data structures, where preparing the sequential access medium comprises partitioning the sequential access medium into three or more partitions, where the sequential access medium is linear tape; and writing the set of data de-duplication data structures and the repository of data blocks to the sequential access medium; where one member of the set of data de-duplication data structures is written to one partition, where a second member of the set of data de-duplication data structures is written to a second, different partition, and where the repository of data blocks is written to a third, different partition;

determining an input plan for sequentially reading a set of data blocks from the sequential access medium, where the input plan comprises a sorted list of blocks;

reading the set of data blocks according to the input plan; and upon determining that members of the set of data blocks are acquired from the sequential access medium:
assembling one or more data items from the set of data blocks.

14. The non-transitory computer-readable storage medium of claim 13, where preparing the sequential access medium to store the set of data de-duplication data structures and the repository of data blocks associated with the set of data de-duplication data structures is based, at least in part, on a number of partitions available on the sequential access medium and one or more of, a number of data structures in the set of data de-duplication data structures, and an order of data structures.

* * * * *